April 27, 1965     J. G. ZUBER     3,180,032
GEAR DIAMETER CERTIFYING GAUGE
Filed Nov. 16, 1962     2 Sheets-Sheet 1
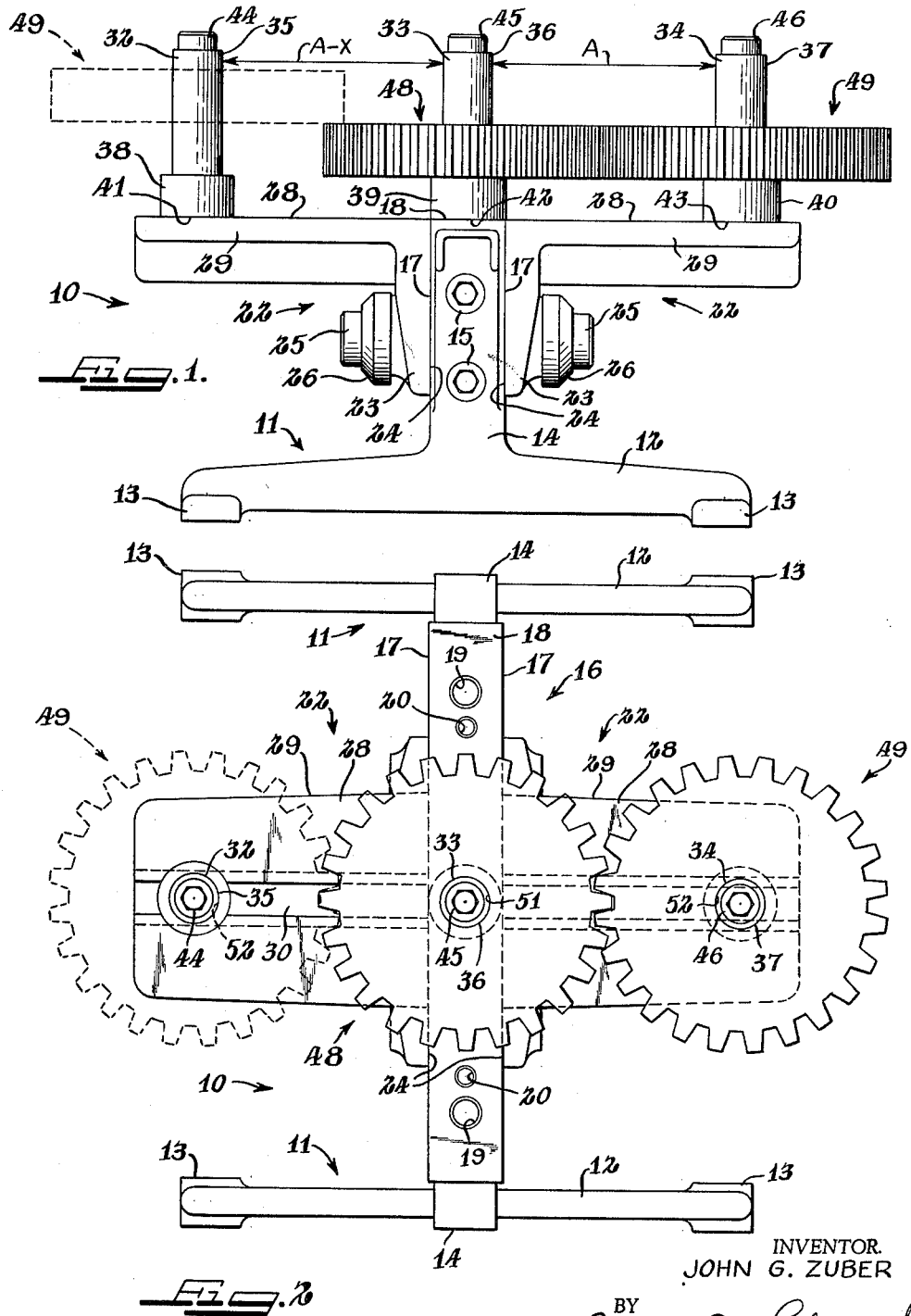
INVENTOR.
JOHN G. ZUBER
BY Robert R. Lockwood
Atty.

April 27, 1965  J. G. ZUBER  3,180,032
GEAR DIAMETER CERTIFYING GAUGE
Filed Nov. 16, 1962  2 Sheets-Sheet 2
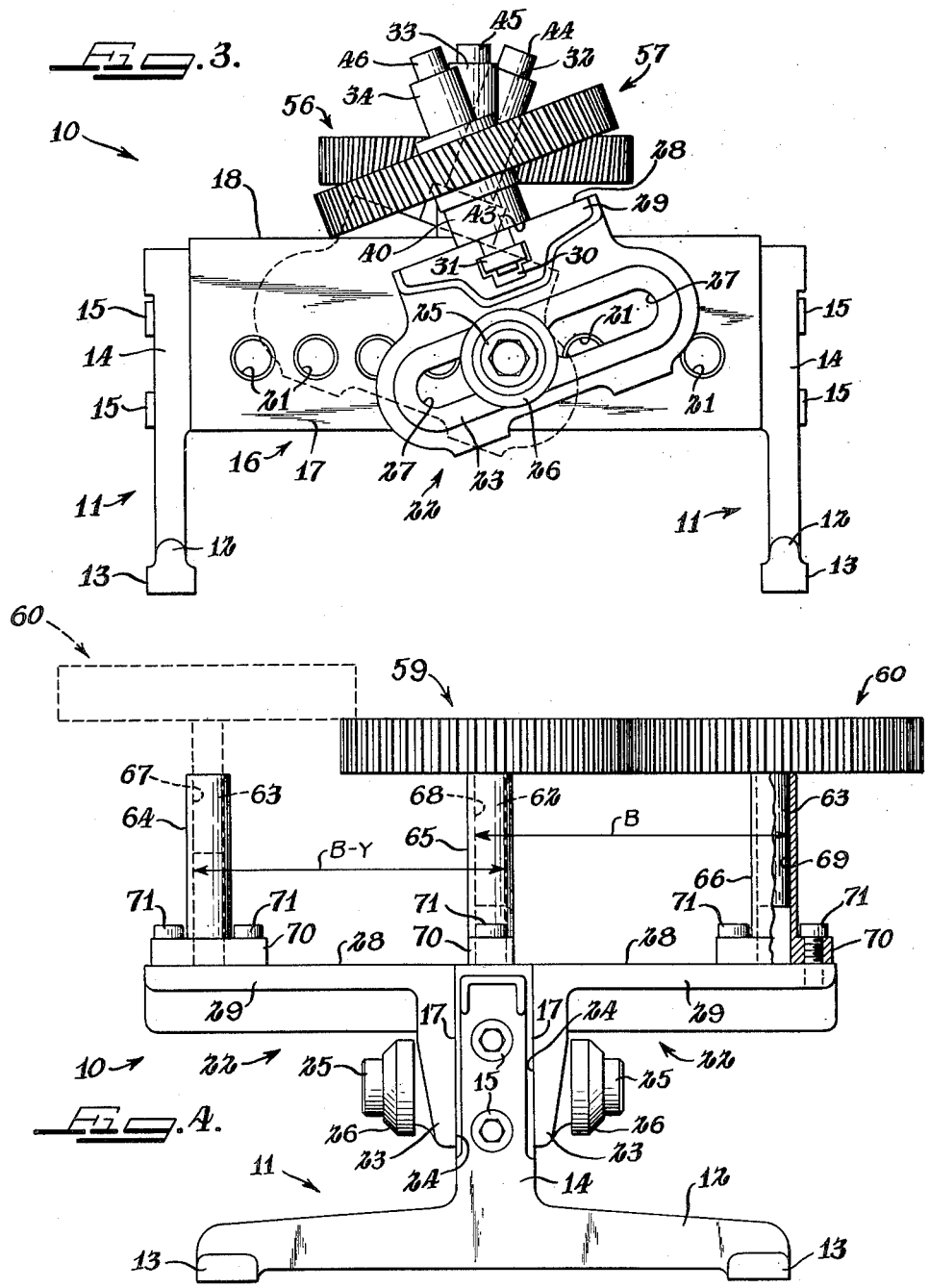

United States Patent Office 3,180,032
Patented Apr. 27, 1965

3,180,032
GEAR DIAMETER CERTIFYING GAUGE
John G. Zuber, 5410 W. Agatite, Chicago, Ill.
Filed Nov. 16, 1962, Ser. No. 238,128
6 Claims. (Cl. 33—179.5)

This invention relates, generally, to gear making and it has particular relation to gear diameter gauging means.

The various methods for specification and measurement for obtaining a desired meshing of spur and helical gears are neither universally accepted nor standardized. Final approval is possible only when the gears are installed and the backlash is found to be adequate but not excessive. A suitable backlash is assured only when the tooth thickness and gear diameter are in the proper combination as the teeth are being formed in the gear blank.

For the manufacture of gears it is conventional to use hobs which are topping and non-topping. The hobs are nearly always ground precisely to the standard which demands that the tooth thickness be exactly equal to the tooth space at the pitch line. This makes it necessary to increase the depth of cut in the gear blank to get some backlash. As the hob gets dull, it is necessary to increase further the depth of the cut. This extra depth of cut results in a tooth shape that deviates from the shape that would be generated from the standard pitch diameter. Since this deviation reduces the ability of the gear to transmit the load smoothly, it is most desirable that the backlash be as small as practice will permit.

Various complicated and expensive devices have been developed for measuring the diameter of gears. These devices require that measurements be made and for this purpose skilled operators are essential for their proper use. Moreover they are time consuming. It is desirable that a device be provided for gauging the diameter of gears which can be used by a relatively unskilled operator and with a minimum of time required for its use. Such a device is provided in accordance with this invention.

Among the objects of this invention are: To provide for gauging the diameter of spur and helical gears in a new and improved manner; to accomplish this without taking measurements of the gears by providing a "go" and "no go" gauge for checking the diameter of the gears; to accommodate a wide range of spur and helical gear sizes having center holes or stems; and to mount an intermediate gear receiving post with respect to a pair of gear receiving posts at different distances apart such that a pair of identical gears will mesh freely when placed on the intermediate post and one of the pair of posts will not mesh when placed on the intermediate post and the other of the pair of posts, the difference in the distances being relatively small and determined in accordance with the amount of backlash that can be tolerated with the gear.

The dimension for the "go" distance for a gear with a hole is the pitch diameter minus the diameter of the maximum hole. For a gear with a stem the "go" distance is the pitch diameter plus the diameter of the minimum stem.

In the drawings:

FIG. 1 is a view, in side elevation, of a gear gauging device employing this invention and showing how spur gears with holes can be gauged.

FIG. 2 is a top plan view of the construction shown in FIG. 1.

FIG. 3 is a view, in end elevation, of the gear gauging device shown in FIG. 1 adapted to gauge helical gears.

FIG. 4 is a view similar to FIG. 1 showing how the gear gauging device can be employed for gauging gears provided with stems.

Referring now particularly to the drawings it will be observed that the reference character 10 designates, generally, a gear gauging device embodying this invention.

The device 10 includes end supports 11—11 that may be formed of malleable cast iron and suitably machined to provide the necessary support surfaces. The end supports 11—11 include base sections 12—12 each of which is provided with foot portions 13—13. Upstanding center sections 14—14 are carried by the base sections 12—12 and they are suitably drilled to receive socket head cap screws 15—15 that are threaded into the ends of a center bar 16 that may be formed of steel. The construction of the center bar 16 and its mounting by the end supports 11—11 are such that it has parallel vertical side surfaces 17—17 and a horizontal top surface 18. The upper side of the center bar 16 is provided with a number of relatively large drilled and tapped holes 19 having therebetween a number of relatively small drilled and tapped holes 20 for receiving screws to mount gear receiving posts to be described.

A series of drilled and tapped holes 21 is provided in the center bar 16. They extend transversely therethrough for mounting angle brackets 22—22 that may be formed of malleable cast iron on opposite sides and at various positions and angular relations therealong. The angle brackets 22—22 have depending flanges 23—23 which are provided with vertical surfaces 24—24 that overlie the vertical side surfaces 17—17 of the center bar 16. Socket head cap screws 25—25 are employed for holding the depending flanges 23—23 in predetermined adjusted relationship along the side surfaces 17—17 of the center bar 16. The socket head cap screws 25—25 are threaded into the drilled and tapped holes 21 and they extend through washers 26—26 and also through elongated slots 27—27 in the depending flanges 23—23 which facilitate mounting thereof in various locations.

The angle brackets 22—22 are so constructed that they have top surfaces 28—28 on horizontal flanges 29—29 which are at right angles to the vertical surfaces 24—24. The horizontal flanges 29—29, as seen in FIG. 3, are provided with T-shaped slots one of which is indicated at 30. The T-shaped slot 30 is provided for slidably receiving a nut 31, it being understood that a similar nut 31 is located in a similar T-shaped slot in the other horizontal flange 29 and that the nuts are adjustable therealong and are non-rotatable therein for receiving screws to hold the gear receiving posts in desired spaced relation which posts now will be described.

Referring particularly to FIGS. 1, 2 and 3 it will be observed that three gear receiving posts are provided and are referred to as a left post 32, an intermediate or center post 33 and a right post 34. They have cylindrical outer surfaces that are indicated, respectively, at 35, 36 and 37. At their lower ends they are provided with larger diameter base portions 38, 39 and 40, respectively, which have bottom surfaces 41, 42 and 43 that are perpendicular to the longitudinal axes of the posts 32, 33 and 34. It will be observed that the bottom surfaces 41 and 43 are positioned on the top surfaces 28—28 of the angle brackets 22—22 and that the bottom surface 42 is positioned on the horizontal top surface 18 of the center bar 16. In the positions of the brackets 22—22 as shown in FIGS. 1 and 2 the top surfaces 28—28 of the horizontal flanges 29—29 are coplanar with the top surface 18 of the center bar 16. They may be angularly related thereto as will be described hereinafter. Socket head cap screws 44, 45 and 46 serve to hold the posts 32, 33 and 34 in position. It will be understood that the cap screws 44 and 46 are threaded into nuts 31 in the T-shaped slots 30 that extend lengthwise of the horizontal flanges 29—29 and that the cap screw 45 is threaded into one or the other of the drilled and tapped holes 19 or 20 as the case may be.

The posts 32, 33 and 34 are arranged to receive spur gears 48 and 49 which are of substantially identical construction and which are provided with center holes 51 and 52 whose diameter is such as to readily slide over the cylindrical outer surfaces 35, 36 and 37.

In FIG. 1 it will be observed that the distance between the nearest portions of the cylindrical outer surfaces 36 and 37 of the posts 33 and 34 is indicated at A. The intermediate or center post 33 is secured in the manner described to the center bar 16 while the right post 34 is spaced therefrom the distance A such that, when the spur gears 48 and 49 are not larger than desired, they will mesh as seen in FIG. 2. This is the "go" position of the spur gears 48 and 49. The spacing A is obtained by actual measurement and as a result of the engineering specification for the identical spur gears 48 and 49. The left post 32 is positioned with the distance between the nearest portions of the cylindrical outer surfaces 35 and 36 spaced apart a distance as indicated at A—X where A is the distance between the nearest portions of the cylindrical surfaces 36 and 37 and X is lesser distance, for example a distance of 0.004", so that, when spur gear 49 is not smaller than the desired size, it will not mesh with spur gear 48 when it is transferred to post 32 as indicated by the broken line showing thereof in FIGS. 1 and 2. This is the "no go" position of the spur gears 48 and 49.

It will be understood that, when the substantially identical gears 48 and 49 are in the "go" position on the intermediate or center post 33 and the right post 34, they can be revolved freely when they are not too large. Remeshing of the spur gears 48 and 49 in several different positions will indicate if any compensation for eccentricity needs to be made. Now when the gear 49 is placed on the left post 32 as shown by broken lines and, as indicated, it does not mesh with the gear 48 on the intermediate or center post 33, it is in the "no go" position and the gears are not too small.

Under ordinary operating conditions it is unnecessary to check each gear as it is made. Rather gears will be checked for diameter at suitable intervals in the manufacture of a number of gears so that necessary steps can be taken to keep the gear diameter within the tolerance provided by the gear gauging device 10.

FIG. 3 shows how the angle brackets 22—22 can be inclined on opposite sides of the center bar 16 for the purpose of gauging helical gears 56 and 57. While the intermediate or center post 33 remains fixed and upright on the center bar 16, the angle brackets 22—22 are inclined in opposite directions on opposite sides of the center bar 16. The angle of inclination of the top surface 28 of each of the horizontal flanges 29 to the horizontal top surface 18 of the center bar 16 is twice the helix angle of the gears 56 and 57 which, it will be understood, are identical. The same procedure previously described for checking the spur gears 48 and 49 is usable for checking the helical gears 56 and 57. In FIG. 3 they are shown in the "go" position. For the "no go" position the helical gear 57 is shifted to the post 32 with the posts 32, 33 and 34 being spaced apart in the manner previously described.

While the posts 32, 33 and 34 are shown in FIGS. 1, 2 and 3 as being generally located along a straight line, it will be understood that this particular relationship is not necessary. The reason for this is that the gears being checked are circular. Thus one or the other of the posts 32 or 34 can be located out of the straight line alignment with the intermediate or center post 33 provided that the distances A and A—X are maintained. Such an arrangement may be required where the diameters of the gears being checked are such that the straight line relationship cannot be maintained using the gear gauging device 10 but the checking operation can be performed provided the post 32 or the post 34 is offset from the straight line relationship while still mantaining the other relationships required for performing the gauging operation.

FIG. 4 shows how spur gears 59 and 60 having stems 62 and 63 can be gauged using the gear gauging device 10 with a slight modification. Here it will be observed that a left post 64, an intermediate or center post 65 and a right post 66 are provided which correspond to the posts 32, 33 and 34 previously described. The posts 64, 65 and 66 are in the form of stem receptacles and, as shown, are arranged to receive the stems 62 and 63 therein. The posts 64, 65 and 66 have cylindrical inner surfaces 67, 68 and 69 which are of such diameter as to receive the stems 62 and 63 with a minimum of clearance. At the bottom of each of the posts 64, 65 and 66 there is a base portion 70 through which socket head cap screws 71—71 extend into the nuts 31 in the T-shaped grooves 30 of the angle brackets 22—22 and into a pair of threaded holes 19 or 20 in the center bar 16.

In order to set up the gear gauging device 10 for gauging the gears 59 and 60 provided with stems 62 and 63, the intermediate or center post 65 is spaced from the right post 66 a distance indicated at B which is measured between the respective furthest portions of these cylindrical inner surfaces 68 and 69. This establishes the "go" position of the right post 66 with respect to the intermediate or center post 65 where the gears 59 and 60 will mesh freely when they are not larger than desired. The "no go" position is established by spacing the left post 64 so that the distance indicated at B—Y between the furthest portions of the cylindrical inner surfaces 67 and 68 is less by the distance Y than the distance B. Now when the spur gear 60 with the stem 63 is applied to the left post 64, as indicated by the broken lines, it will not mesh with the gear 59 on the intermediate or center post 65 when the gears 59 and 60 are not smaller than desired.

With the addition of different sizes of gears it is necessary to provide different sizes of posts 32, 33 and 34 or 64, 65 and 66. While the fit of these posts at the gear, i.e., the center holes 51 and 52 or the stems 62 and 63 is not involved in the gauging, the tolerance of this fit must be made proportionately smaller as the range of the backlash is reduced. For each particular size of gear a suitable block can be provided for convenience in setting the distance A or the distance B. The provision of angular blocks facilitates the setting of the angle brackets 22—22 for gauging helical gears as seen in FIG. 3.

When the gear gauging device 10 is employed allowances, judgment of the operator and hazards of measurement are eliminated. The extra depth of cut for backlash is controlled and is not required to be made generous for safety. This results in gears with a reduced backlash and with improved uniformity and quietness of transmission. The improvement increases as the pitch becomes finer. This is particularly the case when the gears are made of plastic material. Since pairs of gears will be simultaneously checked, the checking operation can be accomplished in half the time that otherwise is required to check them singly.

What is claimed as new is:

1. A gear diameter certifying gauge comprising, in combination:
   (a) a center bar having vertical side surfaces and a horizontal top surface,
   (b) support means mounting said center bar,
   (c) a pair of angle brackets on opposite sides of said center bar each having a depending flange with a vertical surface juxtaposed to the respective vertical side surface of said center bar and a horizontal flange having a top surface at right angles to said vertical surface of said depending flange,
   (d) means securing the depending flanges of said angle brackets to said center bar with the top surfaces of the horizontal flanges in predetermined relation to each other and to said top surface of said center bar depending upon whether the gears to be certified are spur gears or helical gears,
   (e) gear receiving post means on each horizontal flange extending at right angles to its top surface, and
   (f) intermediate gear receiving post means on said center bar extending at right angles to its top surface and spaced from the other gear receiving post means on said horizontal flanges such that identical gears on said intermediate gear receiving post means and on one of the other post means will revolve freely in meshing engagement while when said identical gears on said intermediate gear receiving post means and on the other of said other post means will not mesh.

2. The invention, as set forth in claim 1, wherein:
(a) the top surfaces of the center bar and the horizontal flanges are coplanar, and
(b) the gear receiving post means have cylindrical outer surfaces for receiving spur gears having center holes.

3. The invention, as set forth in claim 1, wherein:
(a) the top surfaces of the center bar and the horizontal flanges are coplanar, and
(b) the gear receiving post means have cylindrical inner surfaces for receiving spur gears having stems.

4. The invention, as set forth in claim 1, wherein:
(a) the gear receiving post means and the angle brackets are angularly shifted to opposite sides of the intermediate gear receiving means for receiving helical gears thereon, and
(b) the angle of shift is twice the helix angle of the helical gears.

5. A method of certifying that the diameters of central hole spur or helical gears are within a specified tolerance by employing a gear diameter certifying gauge which comprises: a center bar having vertical side surfaces and a horizontal top surface, a pair of angle brackets on opposite sides of said center bar each having a depending flange with a vertical surface juxtaposed to the respective vertical side surface of said center bar and a horizontal flange having a top surface at right angles to said vertical surface of said depending flange, gear receiving post means on each horizontal flange extending at right angles to its top surface, and intermediate gear receiving post means on said center bar extending at right angles to its top surface and spaced from the other gear receiving post means such that identical central hole gears on said intermediate gear receiving post means and on one of said other post means will revolve freely in meshing engagement while when said identical gears on said intermediate gear receiving post means and on the other of said other post means will not mesh, said method comprising: mounting one of a pair of like central hole gears of the same diameter upon said intermediate gear receiving post means and the other gear of said pair upon said one of said other post means with free meshing of said gears certifying that they are not oversize, and then transferring said other gear to said other of said other post means with failure to mesh or tight meshing certifying that they are not undersize.

6. A method of certifying that the diameters of stemmed spur or helical gears are within a specified tolerance by employing a gear diameter certifying gauge which comprises: a center bar having vertical side surfaces and a horizontal top surface, a pair of angle brackets on opposite sides of said center bar each having a depending flange with a vertical surface juxtaposed to the respective vertical side surface of said center bar and a horizontal flange having a top surface at right angles to said vertical surface of said depending flange, gear receiving post means on each horizontal flange extending at right angles to its top surface, and intermediate gear receiving post means on said center bar extending at right angles to its top surface and spaced from the other gear receiving post means such that identical stemmed gears on said intermediate gear receiving post means and on one of said other post means will revolve freely in meshing engagement while when said identical gears on said intermediate gear receiving post means and on the other of said other post means will not mesh, said method comprising: mounting one of a pair of like stemmed gears of the same diameter upon said intermediate gear receiving post means and the other gear of said pair upon said one of said other post means with free meshing of said gears certifying that they are not oversize, and then transferring said other gear to said other of said post means with failure to mesh or tight meshing certifying that said gears are not undersize.

References Cited by the Examiner

UNITED STATES PATENTS

| 694,445 | 3/02 | Timmons | 143—132.2 |
| 1,499,124 | 6/24 | Reichmann | 143—132.2 |
| 2,318,970 | 5/43 | Richmond | 33—179.52 |
| 2,599,096 | 6/52 | Dirksen | 143—132.2 |

FOREIGN PATENTS 344,018  11/21  Germany.

ISAAC LISANN, *Primary Examiner.*
LEONARD FORMAN, *Examiner.*